L. WYSSINGER.
WIRE GATE FASTENER.
APPLICATION FILED MAR. 12, 1909.
925,410.
Patented June 15, 1909.
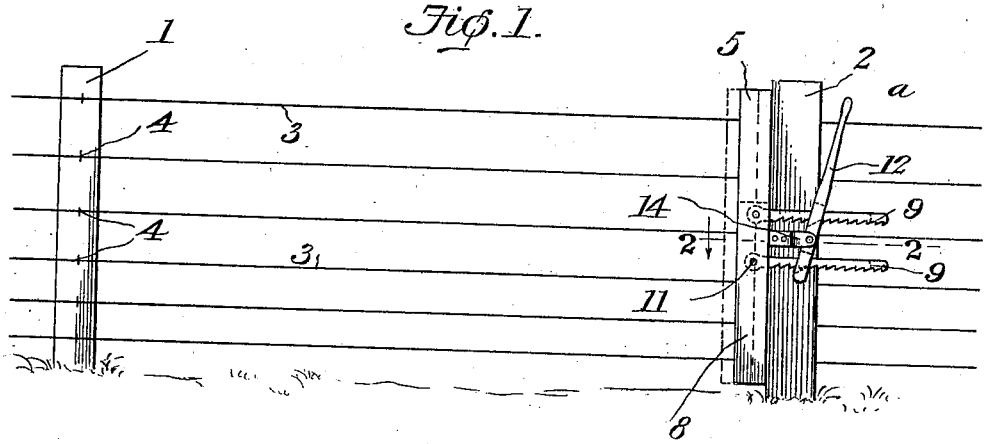
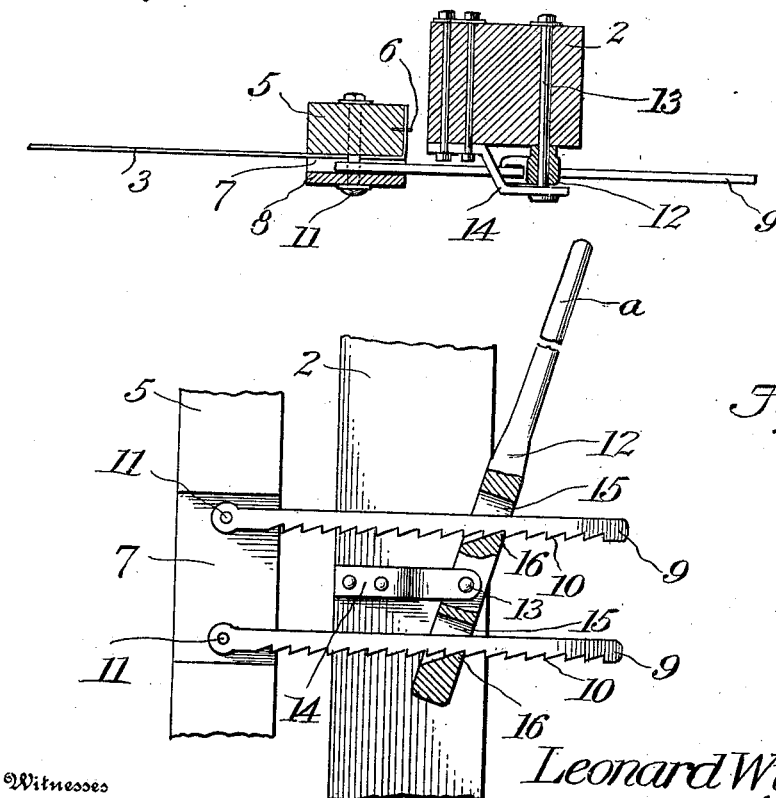
Witnesses
Inventor
Leonard Wyssinger
By Victor J. Evans
Attorney
THE NORRIS PETERS CO., WASHINGTON, D. C.

UNITED STATES PATENT OFFICE.

LEONARD WYSSINGER, OF HAGERSTOWN, MARYLAND, ASSIGNOR OF ONE-HALF TO JACOB C. FREY, OF HAGERSTOWN, MARYLAND.

WIRE-GATE FASTENER.

No. 925,410.     Specification of Letters Patent.     Patented June 15, 1909.

Application filed March 12, 1909. Serial No. 482,969.

*To all whom it may concern:*

Be it known that I, LEONARD WYSSINGER, a citizen of the United States of America, residing at Hagerstown, in the county of Washington and State of Maryland, have invented new and useful Improvements in Wire-Gate Fasteners, of which the following is a specification.

This invention relates to wire gate fasteners, and one of the principal objects of the same is to provide simple and reliable means for closing a wire gate comprising a series of line wires secured to an end bar, said line wires being passed through staples upon one of the gate posts or connected to said post by hinges.

Another object of the invention is to provide a gate fastener for wire gates which will stretch the line wires and hold them firmly in position to close the gate, said fastener being quick in operation and easy to detach.

These and other objects may be attained by means of the construction illustrated in the accompanying drawing, in which,—

Figure 1 is a front elevation of a wire gate and showing the fastener in position to hold the gate closed. Fig. 2 is a horizontal sectional view on the line 2—2 of Fig. 1, looking in the direction indicated by the arrow. Fig. 3 is a detail side elevation and partial section of the fastener.

Referring to the drawing, the numeral 1 designates one of the gate posts, and 2 is the latch post. The line wires 3 of the fence extend freely through staples 4 on the post 1, and the ends of the wires are connected to a stretcher bar 5 by suitable fastenings 6. The bar 5 is provided with a recess 7, and a plate 8 extends over said recess and conforms to the width of the post 5. Pivotally mounted in the recess 7 is a pair of rack bars 9 provided with teeth 10 upon their lower edges, said rack bars being pivotally mounted upon bolts 11 extending through the plate 8 and through the bar 5.

Pivotally mounted upon the post 2 is the locking lever 12, said lever being pivoted upon a bolt 13 extending through a bracket 14 secured to the post 2. Upon each side of the pivotal point of the lever 12 an aperture 15 is provided through which the rack bars 9 extend. The lower walls of the apertures 15 are each provided with a tooth or projection 16 adapted to engage the teeth of the rack bar 9.

The operation of my invention may be briefly described as follows: When the rack bars 9 have been engaged with the lever 12 by grasping the handle *a* of said lever and rocking it back and forth the rack bars 9 are drawn through the apertures 15 to move the stretcher bar 5 from the dotted line position in Fig. 1 to the full line position, thus holding the line wires 3 tight and locking the gate. To release the lever 12 it is pushed backward until the upper bar is released and then pulled forward to release the lower bar 9.

From the foregoing it will be obvious that my gate fastener, while it is simple in construction, is efficient in use and can be manufactured at slight cost.

I claim:—

1. A gate fastener comprising a bar, a pair of rack bars pivoted to said bar, and a lever pivoted to a post and provided with apertures through which the rack bars extend, and teeth at the lower walls of said apertures to engage the teeth of the rack bars.

2. A gate fastener comprising a pair of rack bars pivoted to a stretcher bar, said rack bars having teeth upon their lower edges, a lever pivoted to a post and provided with apertures through which said rack bars extend, and means on the lever for engaging the teeth of the rack bars.

In testimony whereof I affix my signature in presence of two witnesses.

LEONARD WYSSINGER.

Witnesses:
    CHAS. E. BAECHTEL,
    R. H. ALENY, Jr.